United States Patent

Nishida et al.

[15] 3,673,581

[45] June 27, 1972

[54] PLATED MAGNETIC WIRE

[72] Inventors: Hideki Nishida; Kunihiko Yamaguchi; Noriyuki Kumasaka, all of Hachioji-shi; Yutaka Sugita, Kodaira-shi; Hideo Fujiwara, Tachikawa-shi, all of Japan

[73] Assignee: Hitachi, Ltd., Tokyo, Japan

[22] Filed: Feb. 18, 1971

[21] Appl. No.: 116,452

[30] Foreign Application Priority Data

Feb. 27, 1970 Japan....................................45/16274

[52] U.S. Cl. ...........340/174 PW, 340/174 QA, 340/174 ZB, 340/174 QB

[51] Int. Cl. ...........................................................G11c 11/14

[58] Field of Search................340/174 QA, 174 ZB, 174 PC, 340/174 PW, 174 QB

[56] References Cited

UNITED STATES PATENTS

| | | | |
|---|---|---|---|
| 3,125,745 | 3/1964 | Oakland | 340/174 QA |
| 3,188,613 | 6/1965 | Fedde | 340/174 QA |
| 3,193,694 | 7/1965 | Ehresman et al | 340/174 QA |
| 3,195,108 | 7/1965 | Franck | 40/174 QA |
| 3,252,152 | 5/1966 | Davis et al | 340/174 QA |
| 3,470,550 | 9/1969 | Oberg | 340/174 PC |
| 3,480,926 | 11/1969 | Oberg | 340/174 PC |

OTHER PUBLICATIONS

IBM Technical Disclosure Bulletin, " Coupled NDRO Magnetic Film Memory" by Kump et al., Vol. 13, No. 7, 12/70; pp. 2110–2111.

*Primary Examiner*—Stanley M. Urynowicz, Jr.
*Attorney*—Craig, Antonelli & Hill

[57] ABSTRACT

A four-layered plated wire comprising a non-magnetic metal substrate, and non-magnetostrictive 81 % Ni-19 % Fe permalloy films and Co-Ni films alternately superposed on said non-magnetic metal substrate, wherein the permalloy film placed between the two Co-Ni films has a thickness of 0.3 – 0.6 $\mu$ and the other permalloy film has a thickness of 0.2 – 0.4 $\mu$.

1 Claim, 6 Drawing Figures

INVENTORS
HIDEKI NISHIDA, KUNIHIKO YAMAGUCHI,
NORIYUKI KUMASAKA, YUTAKA SUGITA,
AND HIDEO FUJIWARA

BY Craig, Antonelli, Stewart & Hill
ATTORNEYS

INVENTORS
HIDEKI NISHIDA, KUNIHIKO YAMAGUCHI,
NORIYUKI KUMASAKA, YUTAKA SUGITA
AND HIDEO FUJIWARA

BY Craig, Antonelli, Stewart & Hill
ATTORNEYS

PLATED MAGNETIC WIRE

This invention relates to a plated wire adapted for use in memory systems such as electronic digital computers and electronic switching systems.

A plated wire, as shown in FIG. 1, generally comprises a conductor 1 having a diameter on the order of about 0.1 mm, a ferromagnetic film 3 of iron-nickel alloy such as permalloy formed by plating on said conductor either directly or through an under-coating film 2 of non-magnetic metal, and a film 4 for protection made of a high-polymer material and superposed on said ferromagnetic film 3.

In the art of plated wire for memory element intended for non-destructive readout (hereinafter referred to simply as N.D.R.O.), it has been extremely difficult to impart to the above-described single-layered magnetic film an operation region as memory element.

For the purpose of overcoming the above difficulty, a multilayered plated wire was disclosed in Japanese Pat. publication, No. 2742/69 in Japan in 1969 as an excellent element capable of N.D.R.O., in which a magnetically soft film, such as permalloy, and a magnetically hard film, such as Co-Ni alloy, are bonded with each other molecularly. This prior invention was achieved with a view to expanding the N.D.R.O. region by extending the critical field for switching in the direction of the hard axis of magnetization by making use of the bond attributed to ferromagnetic exchange, and further by increasing the coercive force against wall motion by the use of magnetically hard film. The inventor of the prior invention teaches that a four-layered plated wire having alternately superposed magnetically soft films and magnetically hard films has excellent magnetic properties as a practical memory element to which such concept is applied, but does not mention anything as to the types of films to be combined.

The object of the present invention is to provide a four-layered memory element comprising alternately superposed magnetically soft films and magnetically hard films, which has the best magnetic properties as a memory element.

Namely, the present inventors have discovered that, of all the four-layered memory elements, one having permalloy films each having a thickness in a specific range, shows particularly excellent properties in respect of the area of N.D.R.O. region and the output voltage.

As a result of the experiments conducted on the multilayered plated wires of the type previously proposed, using a permalloy film for the magnetically soft films and a Co-Ni film for the magnetically hard films, the present inventors have confirmed that a four-layered plated wire comprising alternately superposed permalloy films and Co-Ni films is superior to two-layered or three-layered plated wires in memory properties.

Namely, the experimental results revealed that, as compared with the four-layered plated wires, the two-layered plated wires have a narrow operation region although said operation range is located on the side where the digit current is relatively small and the output voltage is relatively large, whereas the three-layered plated wires have the disadvantage that the output voltage becomes smaller as the operation region is expanded, and after all the four-layered plated wires are superior to the two-layered or three-layered plated wires in either memory property.

As stated above, the present invention has been achieved based on the discovery that the four-layered plated wire shows particularly excellent properties in respect of the area of N.D.R.O. region and the output voltage, only when it comprises permalloy alloys whose thicknesses each fall in a specific range.

FIG. 2 is a set of diagrams showing the structures of the four-layered plated wires of the type above described.

In FIG. 2, reference numeral 1 designates a substrate wire or under-coating film, 2 a first permalloy film, 3 a first Co-Ni film, 4 a second permalloy film and 5 a second Co-Ni film. These films are formed on top of the substrate wire or under-coating film by plating, each in a desired thickness.

In the four-layered plated wires of the type shown in FIG. 2, the expansion of the N.D.R.O. region and the increasing of the output voltage depend largely upon the thicknesses of the first and second permalloy films. The optimum thickness and composition of the Co-Ni film are variable depending upon the thicknesses of the permalloy films. However, when the thicknesses of the first and second permalloy films are outside certain ranges respectively, satisfactory memory properties cannot be obtained no matter how the thickness and composition of the Co-Ni film are changed.

The present invention consists in a four-layered plated wire comprising a non-magnetic metal wire, and about 81 % Ni-19 % Fe non-magnetostrictive films and Co-Ni films alternately superposed on said non-magnetic metal wire, wherein the permalloy film placed between the two Co-Ni films has a thickness of 0.3 - 0.6 $\mu$ and the other permalloy film has a thickness of 0.2 - 0.4 $\mu$.

The present invention will be described in further detail hereunder with reference to the accompanying drawings. In the drawings, FIG. 1 is a perspective view showing the general structure of a plated wire;

FIGS. *2a* and *2b* comprises a set of diagrams respectively showing the structures of the four-layered films in four-layered plated wires;

Figure 1:
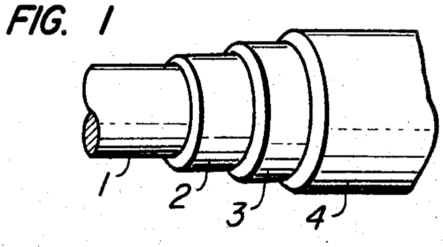
Figure 2A:
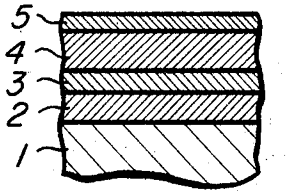
Figure 2B:
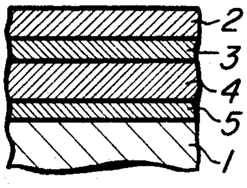

The plated wire of the invention will be described in detail by way of example hereunder:

The sample used in the experiment was a four-layered plated wire of the structure shown in FIG. 2(*a*), which had been produced by forming a non-magnetic Ni-P film having a thickness of 0.1 – 0.2 $\mu$ as an under-coating film on the surface of a Cu-Ag alloy wire having a diameter of 0.1 mm by plating and then forming permalloy films and Co-Ni films alternately by plating on top of said Ni-P under-coating film.

In this case, the thicknesses of the permalloy films and the thicknesses and composition of the Co-Ni films were varied in each run. The composition of the permalloy films was unchanged and was about 81 % Ni-19 % Fe, so as to provide non-magnetostrictiveness.

Figure 3:
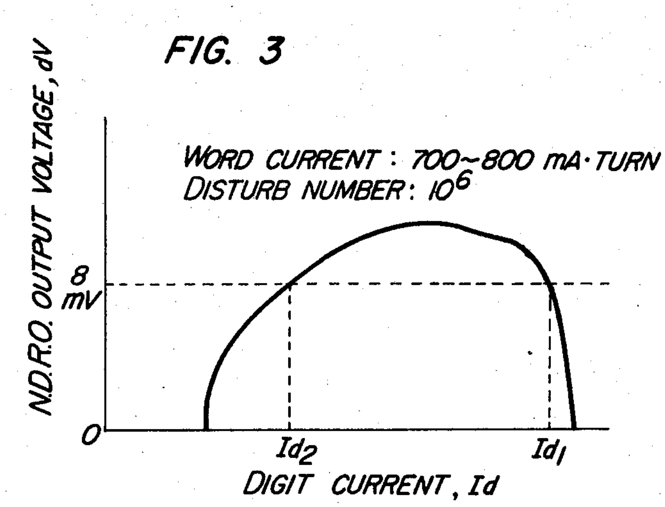
FIG. 3 is a diagram showing the memory property of the ordinary plated wire.

The various four-layered plated wires produced in the manner described were measured for memory properties, the results of which will be described hereunder:

In FIG. 3, there is shown a diagram which shows the memory property of the ordinary plated wire by way of the relationship between the digit current Id and the output voltage dV. In this diagram, the word current is 700 – 800 mA. turn and the number of disturb pulses is $10^6$.

Reference character $Id_1$ and $Id_2$, respectively, represent the upper limit and the lower limit of the digit current Id which provides $dV = 8$ mV. and the area defined by $Id_1$ and $Id_2$ indicates the N.D.R.O. operation region relative to the practical Id. The present inventors indicated the practical excellence of the memory property by the value of $Id_1/Id_2$.

Figure 4:
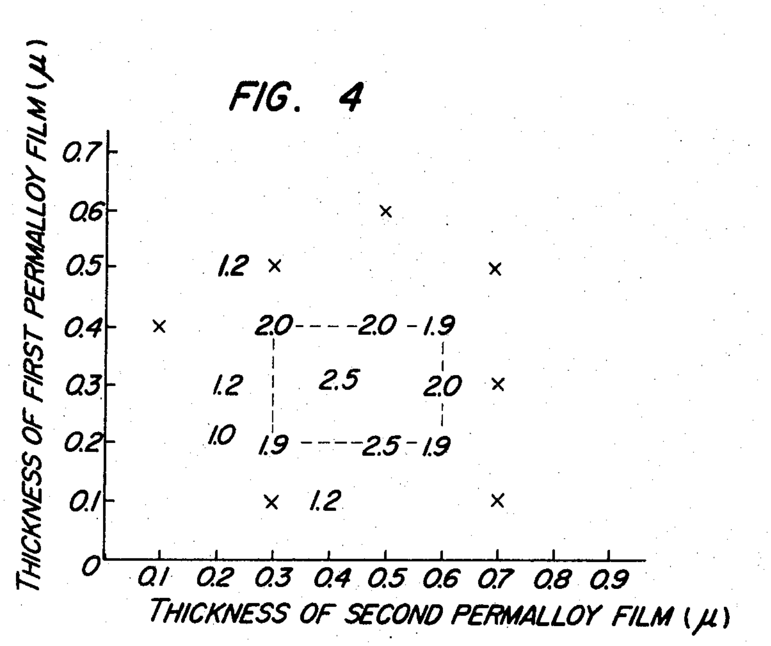
FIG. 4 is a diagram indicating the excellent in memory property of the four-layered plated wire.

FIG. 4 is a chart with the values of $Id_1/Id_2$ plotted therein which were obtained on the four-layered plated wires comprising various combinations of thicknesses of the first and second permalloy films. The composition of the first and second Co-Ni films were experimentally selected so that the plated wires might show the best memory properties, with the particular combinations of the thicknesses of the permalloy films, respectively. The X markings in the chart signify that an operation region providing $dV = 8$ mV is not present for the particular combination of thicknesses of the first and second permalloy films.

As may be seen from the chart, large values of $Id_1/Id_2$, signifying excellent practical memory properties, are concentrated within the region encircled by the dotted line, and furthermore the values of $Id_1/Id_2$ largely vary between the inside and outside of the region.

From the foregoing, it has been found that four-layered plated wires having the thickness of the first permalloy film within the range of 0.2 – 0.4 $\mu$ and the thickness of the second permalloy film within the range of 0.3 – 0.6 $\mu$, show particularly excellent memory properties, as compared with those outside said ranges.

Now, an experimental example will be illustrated hereunder, in which experiments were conducted on representative combinations of the thicknesses of the first and second permalloy films shown in FIG. 4.

The table given below shows three representative examples of the combination of the thicknesses of the first and second permalloy films and exemplifies the thicknesses of the Co-Ni films which together with the respective combinations of the thicknesses of the first and second permalloy films, give the best memory properties.

| Type of Film | Film Thickness and Composition | | |
|---|---|---|---|
| | Sample No. 1 | Sample No. 2 | Sample No. 3 |
| First permalloy film | 0.3$\mu$ | 0.5$\mu$ | 0.1$\mu$ |
| Second permalloy film | 0.4$\mu$ | 0.7$\mu$ | 0.4$\mu$ |
| First Co-Ni film | 0.064$\mu$ (75 % Co-25 % Ni) | 0.081$\mu$ (65 % Co-35 % Ni) | 0.050$\mu$ (80 % Co-20 % Ni) |
| Second Co-Ni film | 0.036$\mu$ (90 % Co-10 % Ni) | 0.052$\mu$ (80 % Co-20 % Ni) | 0.025$\mu$ (95 % Co-5 % Ni) |

Note: The composition of the permalloy films was approximately 81 % Ni-19 % Fe so as to provide non-magnetostrictiveness.

Figure 5:
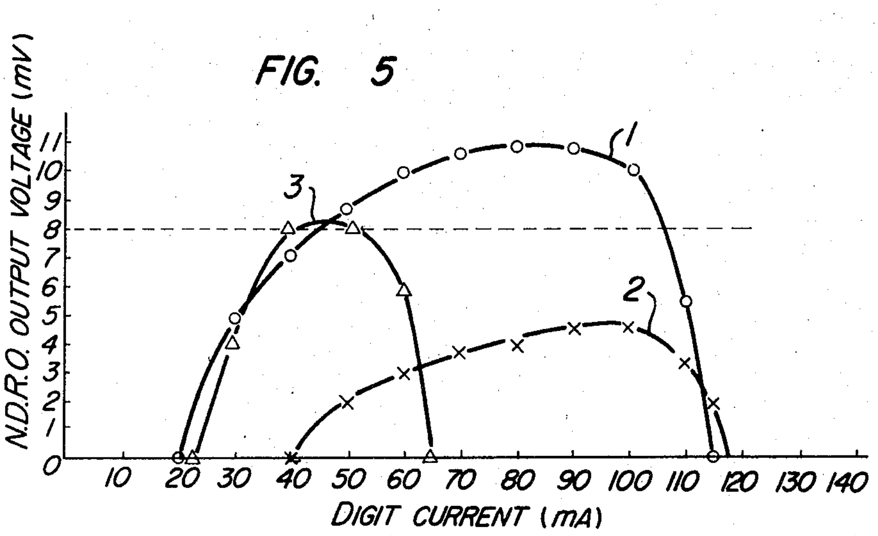
FIG. 5 is a diagram showing in comparison the memory properties of four-layered plated wires.

The relationship between the digit current and the N.D.R.O. output voltage of each of the three sample plated wires shown above, is illustrated in FIG. 5. In FIG. 5, curves 1, 2 and 3, respectively, represent the characteristic curves of Samples Nos. 1, 2 and 3.

From the diagram of FIG. 5, it will be seen that in the case of Sample No. 2, the N.D.R.O. output voltage is lower than 8 mV and in the case of Sample No. 3, the region of the N.D.R.O. output voltage exceeding 8 mV is narrow, but in the case of Sample No. 1 which embodies the present invention, the region of digit current which provides a N.D.R.O. output voltage exceeding 8 mV is wide.

As may be clearly understood from the foregoing detailed description, the four-layered plated wires according to the instant invention, as compared with the other plated wires of the same type, has a wide N.D.R.O. operation region, a high output voltage and excellent memory properties, and will demonstrate great practical effects when used as a memory element in electronic digital computers, electronic switching systems, etc.

What is claimed is:

A four-layered plated wire comprising a substrate wire, and non-magnetostrictive permalloy films composed of about 81 % of Ni and about 19 % of Fe and Co-Ni based alloy films alternately superposed on said substrate wire, wherein the permalloy film placed between the two alloy films has a thickness of 0.3 – 0.6 $\mu$ and the other permalloy film has a thickness of 0.2 – 0.4 $\mu$.

* * * * *